Patented Oct. 13, 1931

1,826,846

UNITED STATES PATENT OFFICE

EDUARD TSCHUNKUR AND WALTER BOCK, OF COLOGNE-MULHEIM, GERMANY

ARTIFICIAL RUBBER

No Drawing. Application filed August 17, 1929, Serial No. 386,730, and in Germany June 10, 1927.

The present invention relates to a process of vulcanizing masses obtained by polymerization of diolefines and to new products obtainable by such vulcanization.

In accordance with the invention at least two different plastic or elastic masses, produced according to various polymerization processes from diolefines, such as butadiene (—1.3), isoprene, 2.3-dimethylbutadiene (—1.3) or homologues and analogues thereof, are intimately mixed prior to vulcanization with a finely divided soot variety whereby it is to be understood that the term "finely divided" is intended to include dimensions of particles ranging from those of lamp black to colloidal dimensions. As soot varieties may be mentioned by way of example carbon black, lamp black, oil soot and the like.

Vulcanization can be performed according to any desired method, for instance by heating the mixtures of the finely divided soot variety with the polymerizates after the addition of a vulcanizing agent, such as sulfur for example, compounds capable of splitting off sulphur, selenium, trinitrobenzene+metal oxides and the like and with or without the addition of other compounds promoting or influencing vulcanization, to temperatures usually applied in vulcanization processes. (The said heating may, for example, be carried out at temperatures up to about 170° C.)

The vulcanization of mixtures containing at least two different polymerization products of diolefines in most cases yield especially valuable results, the vulcanizates being products of technically high qualities resembling soft rubber vulcanizates. The employment of mixtures containing different polymerizates makes it possible to vary the quality of the vulcanizate obtained considerably in any desired direction, whereas considerably less variation is possible when employing only a single polymerizate. Such mixtures of different polymerization products are obtainable according to most various methods, for instance by mechanically mixing different polymerizates by rolling or kneading, or by polymerizing mixtures of different diolefines according to any desired process, or by polymerizing such a diolefine in the presence of an incompletely or completely polymerized mass derived from another diolefine, or by polymerizing one and the same diolefine gradually according to different polymerization methods.

The vulcanizates obtained from such mixtures with the addition of a soot variety combine good tensile strength with a good stretch, especially in cases where carbon black has been added. In the latter case, for instance, products possessing a tensile strength between about 150–275 kilograms per square centimeter at a stretch of about 400–800% generally are obtainable, whereas in case of applying other finely divided fillers the corresponding figures will generally only amount to about 75–150 kilograms per square centimeter and 300–600%.

The quality of rubber goods is often characterized by the so called "index of strength", that is to say by the product of tensile strength in kilograms per square centimeter and the percentage stretch. When applying this method of characterizing the quality of our vulcanization products, figures between about 50.000 and 190.000 will generally be obtainable, whereas without the addition of a finely divided soot variety only vulcanizates having values figuring between about 15000 to 40000 are obtainable. The improvement in qualities of our new vulcanizates compared with that of the latter therefore amounts up to about 600–900%, whereas the known addition of carbon black to rubber only produces an improvement in qualities below about 100%.

It may be mentioned that all the figures given above, especially the proportion between the tensile strength and stretch will vary within the widest limits, depending as well on the starting hydrocarbons as on the polymerization and vulcanization methods and on the kind and quantity of the soot variety added in the finely divided state, carbon black generally being superior in its action to the other soot variety. Also the method of manufacture and the size and form of particles of the soot variety will influence the properties of the vulcanization products to a far reaching extent.

Therefore our invention is not limited to vulcanizates, the mechanical properties of which are strictly within the figures mentioned above, but is intended to include all the vulcanizates which are obtainable by vulcanizing mixtures containing at least two different polymerizates of diolefines and a finely divided soot variety.

The quantities of the soot variety to be added vary within wide limits. In some cases already rather small amounts of the soot variety, for example carbon black will yield useful vulcanizates, but in most cases, especially when starting with rather plastic polymerizates amounts between about 30–80% (calculated upon the polymerizate), will be useful to produce vulcanizates of high technical value.

Obviously besides the soot varieties mentioned other additions promoting or influencing the vulcanization process or the quality of the vulcanizates, such as vulcanization accelerators, plastifying agents, as for instance resins, oils, hydrocarbons, etc. may be added without departing from our invention. Also it will generally be useful to add, besides the finely divided soot variety, other finely divided fillers or such, possessing a larger size of particles than defined by the expression "finely divided".

The following examples will illustrate our invention without limiting it thereto, the parts being by weight.

Example 1

About 75 parts of butadiene and about 75 parts of 1.3-dimethylbutadiene are emulsified with 150 parts of water and 15 parts of sodium stearate and polymerized at about 70° C. for about one week. The polymerizates thus obtainable are mixed with 3 parts of sulfur, 15 parts of zinc oxide, 2 parts of tar, 2 parts of stearic acid, 50% of carbon black (calculated upon the mixed polymerizate) and 1 part of diphenylguanidine by rolling and the mixture is vulcanized by heating for about 40–50 minutes to a temperature of about 135–140° C. In this manner, or according to similar vulcanization methods, vulcanizates are obtainable possessing a tensile strength of about 180–250 kilograms per square centimeter at a stretch of about 600–800%, whereas the corresponding figures in the absence of carbon black will be 30–50 kilograms per square centimeter and 300–500%.

Vulcanizates of similar properties are obtainable when replacing the 1.3-dimethylbutadiene by 2.3-dimethylbutadiene or by causing polymerization to take place in the presence of water and another suitable emulsifying agent and vulcanizing as described above, or by starting with the corresponding isoprene-dimethylbutadiene mixture or with butadiene isoprene-dimethylbutadiene mixtures of different composition and otherwise working in the same manner.

Example 2

A mixed polymerizate is prepared by heating 100 parts of butadiene to 70–75° C. for about one month, adding 50 parts of butadiene, 7.5 parts of glue, 7.5 parts of the sodium salt of isobutylnaphthalene sulfonic acid and 150 parts of water and shaking the reaction mixture for about two weeks at a temperature of 60–70° C.

The polymerizate thus obtainable is mixed by rolling with 2 parts of sulfur, 10 parts of zinc oxide, 3 parts of stearic acid, 2 parts of tar, 1 part of pitch, 45 parts of carbon black and 15 parts of thiocarbanilide and vulcanized at a temperature of about 135–140° C. Vulcanizates are thus obtainable possessing a tensile strength of about 150–170 kilograms per square centimeter at a stretch of about 500–600%, whereas the corresponding figures of the same vulcanizates, but without the addition of carbon black, are 30–40 kilograms per square centimeter at a stretch of 200–300%.

Vulcanizates of somewhat similar properties will be obtainable by replacing in this example the butadiene by the equivalent quantity of isoprene.

Example 3

To 100 parts of butadiene, 0,2–0,4 part of sodium wire is added and the mixture is polymerized for about 3 to 4 days at normal temperature in a nitrogen atmosphere. 30 parts of the polymerizate thus obtainable are dissolved in 150 parts of butadiene (if desired with the addition of a suitable organic solvent, such as turpentine oil, ligroin and the like), and the solution is emulsified with 150 parts of water and 15 parts of sodium stearate and heated to about 50° C. for about one week, while continually shaking.

The mixed polymerizate thus obtainable is mixed by rolling or kneading with 3 parts of sulfur, 15 parts of zinc oxide, 2 parts of stearic acid, 2 parts of tar, 55 parts of carbon black and one part of diphenylguanidine and vulcanized for instance by heating to about 135–140° C. Vulcanizates are thus obtainable possessing a tensile strength of about 160–200 kilograms per square centimeter at a stretch of about 600–800%, whereas the corresponding figures without the addition of carbon black are 30–50 kilograms per square centimeter and 300–400%.

When replacing in this example the butadiene by isoprene, vulcanizates of somewhat similar properties will be obtained.

Example 4

100 parts of butadiene are emulsified with 15 parts of sodium stearate and 150 parts of water and polymerized at about 65° C. Before or after finishing of the polymerization process 100 parts of 2.3-dimethylbutadiene are added and the mixture is further polymerized at the same temperature while shaking or stirring. A plastic homogenous mass is thus obtained yielding, when vulcanized as described in Example 3 with the addition of 60% of carbon black, resilient vulcanizates, possessing a tensile strength of 175–200 kilograms per square centimeter at a stretch of 500–800%, whereas the corresponding figures without the addition of carbon black are about 30–60 kilograms per square centimeter and about 300–500%.

Somewhat similar products are obtainable by replacing butadiene by the equivalent amount of isoprene.

*Example 5*

50 parts of 2.3 dimethylbutadiene are heated to 70° C. until about half of the dimethylbutadiene has polymerized. To this mixture 100 parts of butadiene, 12 parts of sodium stearate and 100 parts of water are added, the mixture is emulsified and further polymerized at about 60–70° C. The mixed polymerizate thus obtainable is vulcanized with the addition of 50% of carbon black (calculated on the mixed vulcanizate) as described in Example 4, yielding vulcanizates possessing a tensile strength of about 180–250 kilograms per square centimeter at a stretch of 500–700%, whereas the corresponding figures without the addition of carbon black will be about 30–60 kilograms per square centimeter and 300–500%.

*Example 6*

100 parts of butadiene and 75 parts of dimethylbutadiene are heated to 70° C. for about 4–6 weeks. A homogeneous plastic mass is thus obtained which is vulcanized after the addition of 55% of carbon black (calculated on the vulcanizate) as described in Example 4. The vulcanizate possesses a tensile strength of about 180–220 kilograms per square centimeter at a stretch of 500–800%.

A product of similar properties is obtained when polymerizing the above mentioned mixture in the presence of water and of a suitable emulsifying agent and vulcanizing as described in Example 4.

*Example 7*

50 parts of a product, obtained by polymerizing 2.3-dimethylbutadiene at about 70–75° C., and 50 parts of a mass, obtained by polymerizing isoprene in emulsion with an equal part of water and about 10% of the sodium salt of castor oil sulfonic acid (Turkey-red oil), are mixed by rolling or kneading. The mixture thus obtained is vulcanized in any desired manner after the addition of 50% its weight of carbon black, a vulcanizate possessing a tensile strength of 150–175 kilograms per square centimeter at a stretch of 500–650%, being thus obtainable.

*Example 8*

About 15 parts of a product, obtained by polymerizing butadiene in emulsion with the equal part of water, 5% of sodium stearate and 7.5% of the sodium salt of isobutylnaphthalene sulfonic acid and heating the emulsion to about 30–40° C., are introduced into a mixture of 100 parts of butadiene and 100 parts of ligroin, 0.75 parts of sodium wire is added and further polymerization is performed by heating to a temperature of about 15–35° C. When vulcanizing this polymerizate with the addition of 60% its weight of carbon black as described in Example 4, elastic vulcanizates are obtained, possessing a tensile strength of 150–200 kilograms per square centimeter at a stretch of 600–800%.

*Example 9*

70 parts of butadiene are emulsified with 100 parts of 10% aqueous sodium oleate solution, 3 parts of magnesium oleate and 5 parts of 1/1 n caustic soda solution, the emulsion is made homogeneous and caused to polymerize by heating to about 60° C. for about 2 days. The mass thus obtainable is mixed by rolling with 30 parts of a mass, obtained by shaking butadiene in the presence of 0.2% its weight of sodium wire at room temperature for about 3 days. To 100 parts of this mixed polymerizate 60 parts of carbon black, 15 parts of zinc oxide, 2 parts of stearic acid, 2 parts of colophony, 1 part of sulfur and 1,3 parts of the dithiocarbamate of tetrahydroquinaldine are added and vulcanization is effected by heating to about 135–140° C. A vulcanizate is thus obtainable possessing a tensile strength of about 170–200 kilograms per square centimeter at a stretch of about 600–700%.

This is a continuation in part of our copending application Serial No. 281,587 filed May 29, 1928.

We claim:—

1. As new products the vulcanizates obtainable by vulcanizing a mixture of at least two different solid polymerization products of diolefines, in the presence of about 30–80% its weight of a soot variety in a finely divided form, said vulcanizates generally possessing indices of strength between about 50.000 and 190.000.

2. As new products the vulcanizates obtainable by vulcanizing a mixture of at least two different solid polymerization products of diolefines, in the presence of about 30–80% its weight of carbon black, said vulcanizates generally possessing indices of strength between about 50.000 and 190.000.

3. As new products the vulcanizates obtainable by vulcanizing a mixture of at least two different solid polymerization products of a hydrocarbon of the group consisting of butadiene, isoprene and dimethylbutadienes, in the presence of a soot variety in a finely divided form, said vulcanizates generally possessing indices of strength between about 50.000 and 190.000.

4. As new products the vulcanizates obtainable by vulcanizing a mixture of at least two different solid polymerization products of a hydrocarbon of the group consisting of butadiene, isoprene and dimethylbutadienes, in the presence of carbon black, said vulcanizates generally possessing indices of strength between about 50.000 and 190.000.

5. As new products the vulcanizates obtainable by vulcanizing a mixture of at least two different solid polymerization products of a hydrocarbon of the group consisting of butadiene, isoprene and dimethylbutadienes, in the presence of about 30–80% its weight of a soot variety in a finely divided form, said vulcanizates generally possessing indices of strength between about 50.000 and 190.000.

6. As new products the vulcanizates obtainable by vulcanizing a mixture of at least two different solid polymerization products of a hydrocarbon of the group consisting of butadiene, isoprene and dimethylbutadienes, in the presence of about 30–80% its weight of carbon black, said vulcanizates generally possessing indices of strength between about 50.000 and 190.000.

7. As new products the vulcanizates obtainable by polymerizing about equal parts of butadiene and a compound of the formula:

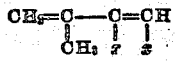

wherein one $x$ means hydrogen and the other $x$ stands for methyl, in the presence of water and of an emulsifying agent, and vulcanizing the mixed polymerizates thus obtainable with the addition of about 50% their weight of carbon black, said rubber goods possessing a tensile strength between about 180–250 kilograms per square centimeter at a stretch of about 600–800%.

In testimony whereof we have hereunto set our hands.

EDUARD TSCHUNKUR. [L. S.]
WALTER BOCK. [L. S.]